(12) United States Patent
Nakashima et al.

(10) Patent No.: US 12,224,517 B2
(45) Date of Patent: Feb. 11, 2025

(54) ELECTRICAL JUNCTION BOX

(71) Applicant: Yazaki Corporation, Tokyo (JP)

(72) Inventors: Akinori Nakashima, Makinohara (JP); Hiroki Goto, Makinohara (JP); Takao Nogaki, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 357 days.

(21) Appl. No.: 17/891,471

(22) Filed: Aug. 19, 2022

(65) Prior Publication Data

US 2023/0064013 A1 Mar. 2, 2023

(30) Foreign Application Priority Data

Aug. 30, 2021 (JP) ................................. 2021-140354

(51) Int. Cl.
| | |
|---|---|
| *H01R 13/506* | (2006.01) |
| *H01R 13/04* | (2006.01) |
| *H01R 13/627* | (2006.01) |
| *H01R 24/76* | (2011.01) |
| *H01R 101/00* | (2006.01) |

(52) U.S. Cl.
CPC .......... *H01R 13/506* (2013.01); *H01R 13/04* (2013.01); *H01R 13/6272* (2013.01); *H01R 24/76* (2013.01); *H01R 2101/00* (2013.01)

(58) Field of Classification Search
CPC .. H01R 13/506; H01R 13/04; H01R 13/6272; H01R 24/76; H01R 2101/00; H01R 31/06; H01R 13/112; B60R 16/0238
See application file for complete search history.

(56) References Cited

U.S. PATENT DOCUMENTS 9,231,330 B2 * 1/2016 Tashiro ................ H01R 13/502

FOREIGN PATENT DOCUMENTS

| JP | 2004-134278 A | 4/2004 |
|---|---|---|
| JP | 2015-80342 A | 4/2015 |

* cited by examiner

*Primary Examiner* — Briggitte R. Hammond
(74) *Attorney, Agent, or Firm* — Sughrue Mion, PLLC

(57) ABSTRACT

An electrical junction box includes a frame body, a rescue terminal portion formed in a rectangular parallelepiped shape in a plan view and including a longitudinal side face, two lateral side faces connected to the longitudinal side face, and an upper face, a resin cover configured to cover the longitudinal side face, the two lateral side faces and the upper face. The resin cover includes a rotary shaft extending along the longitudinal side face and provided on a side where the longitudinal side face is provided and on a base end portion of the rescue terminal portion opposite to the upper face, the resin cover being configured to rotate with respect to the frame body about the rotary shaft.

3 Claims, 11 Drawing Sheets

ELECTRICAL JUNCTION BOX

CROSS-REFERENCE TO RELATED APPLICATION

The present application claims priority to Japanese Patent Application No. 2021-140354 filed on Aug. 30, 2021, the entire content of which is incorporated herein by reference.

TECHNICAL FIELD

The presently disclosed subject matter relates to an electrical junction box.

BACKGROUND

An electrical junction box of the related art includes a cassette including a rescue terminal portion capable of connecting a booster cable for power supply at the time of battery exhaustion (for example, see JP 2015-80342A). The cassette and the electrical junction box including the cassette disclosed in the related art are provided with an electronic component attachment portion to which an electronic component can be attached and a rescue terminal attachment portion to which a rescue terminal formed of a metal plate can be attached on the cassette (socket portion) detachable from a frame body of the electrical junction box. One of the rescue terminal, a cover that covers the rescue terminal, and the electronic component is selected and attached to the cassette, and in a state in which one of them is attached, others cannot be attached.

However, in the electrical junction box of the related art described above, the rescue terminal attachment portion formed in a rectangular parallelepiped shape in a plan view is covered with a cover formed in a rectangular parallelepiped shape in the plan view as well. A shaft portion provided along a lateral direction of the cover is rotatably attached to a shaft portion attachment portion of a cover attachment portion provided in the electrical junction box. Therefore, a rotation radius from the shaft portion of the cover to a rotation tip of the cover is a long portion side of the rectangle, and a large cover opening and closing space is required. Further, in a rotation hinge structure including the shaft portion and the shaft portion attachment portion for rotatably supporting the cover, since a rotary shaft is provided in the lateral direction of the cover, a force in a twisting direction acting on the shaft portion is likely to increase due to the principle of leverage during the opening and closing operation of the cover, and there is a concern that the cover may not be detached from the shaft portion attachment portion.

SUMMARY

Illustrative aspects of the presently disclosed subject matter provide an electrical junction box in which a resin cover that covers a rescue terminal portion is less likely to come off while an opening and closing space of the resin cover is reduced.

According to an illustrative aspect of the presently disclosed subject matter, an electrical junction box includes a frame body, a rescue terminal portion formed in a rectangular parallelepiped shape in a plan view and including a longitudinal side face, two lateral side faces connected to the longitudinal side face, and an upper face, a resin cover configured to cover the longitudinal side face, the two lateral side faces and the upper face. The resin cover includes a rotary shaft extending along the longitudinal side face and provided on a side where the longitudinal side face is provided and on a base end portion of the rescue terminal portion opposite to the upper face, the resin cover being configured to rotate with respect to the frame body about the rotary shaft.

According to the electrical junction box of the presently disclosed subject matter, a resin cover that covers a rescue terminal portion is less likely to come off, while an opening and closing space of the resin cover is reduced.

Other aspects and advantages of the presently disclosed subject matter will be apparent from the following description, the drawings and the claims.

DESCRIPTION OF EMBODIMENTS

Figure 1:
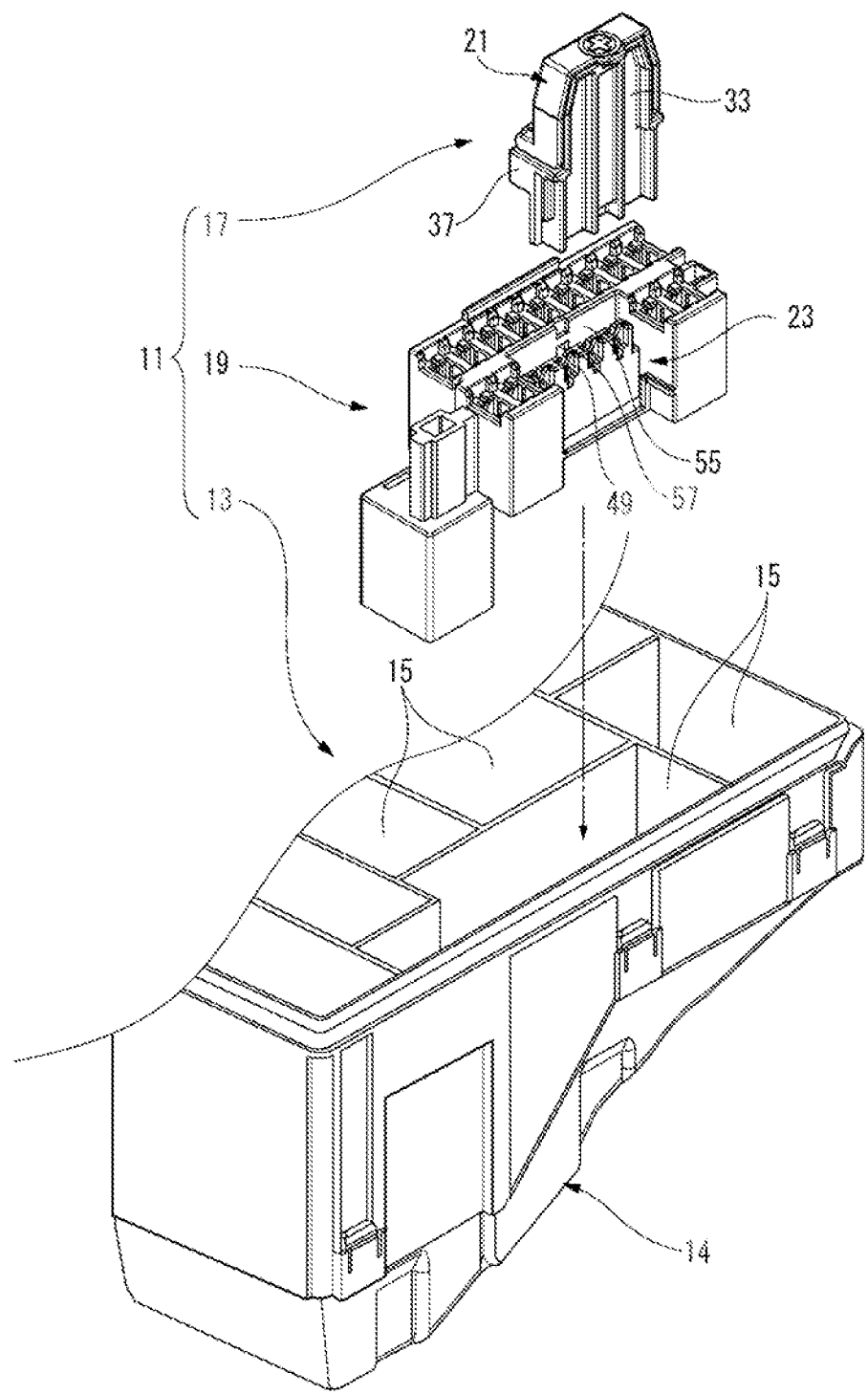
FIG. 1 is an exploded perspective view of main parts of an electrical junction box according to an embodiment of the presently disclosed subject matter.

Hereinafter, an embodiment according to the presently disclosed subject matter will be described with reference to the drawings. FIG. 1 is an exploded perspective view of main parts of an electrical junction box 11 according to an embodiment of the presently disclosed subject matter. For example, a "fuse block" in which a large number of fuses can be inserted and removed is used for a power transmission line of a vehicle in order to protect electric circuits of various electronic devices. Since the fuse block may have a relay and the like, the fuse block is also called a "relay box" or a "junction block". In the present specification, the fuse block, the relay box, and the junction block are collectively referred to as an electrical junction box 11.

The electrical junction box 11 according to the present embodiment includes a frame body 13 forming an outer shell, a busbar (not shown) provided integrally with the frame body 13, a lower cover 14 covering a lower opening of the frame body 13, an upper cover (not shown) covering an upper opening of the frame body 13, and a rescue terminal portion 17. A plurality of mounting portions 15 to which electric components such as a relay, a fuse, a fusible link, and a harness connection socket are mounted are provided on, for example, an upper face of the frame body 13. Each of the mounting portions 15 is provided with a terminal portion (not shown) formed by bending or cutting a plate-shaped busbar. The terminal portion disposed in the mounting portion 15 is electrically connected to a power supply side terminal of the power supply side terminal and a load side terminal of a relay, a fuse, a fusible link, a harness connection socket, or the like mounted on the mounting portion 15.

The electrical junction box 11 according to the present embodiment includes the frame body 13 and the rescue terminal portion 17. The rescue terminal portion 17 is detachably mounted on a socket portion 19 of the frame body 13. In the present embodiment, the socket portion 19 is detachably mounted on the mounting portion 15 of the frame body 13. The socket portion 19 may be formed integrally with the frame body 13. Hereinafter, the socket portion 19 will be described as a part of the electrical junction box 11 integrated with the frame body 13.

Figure 2:
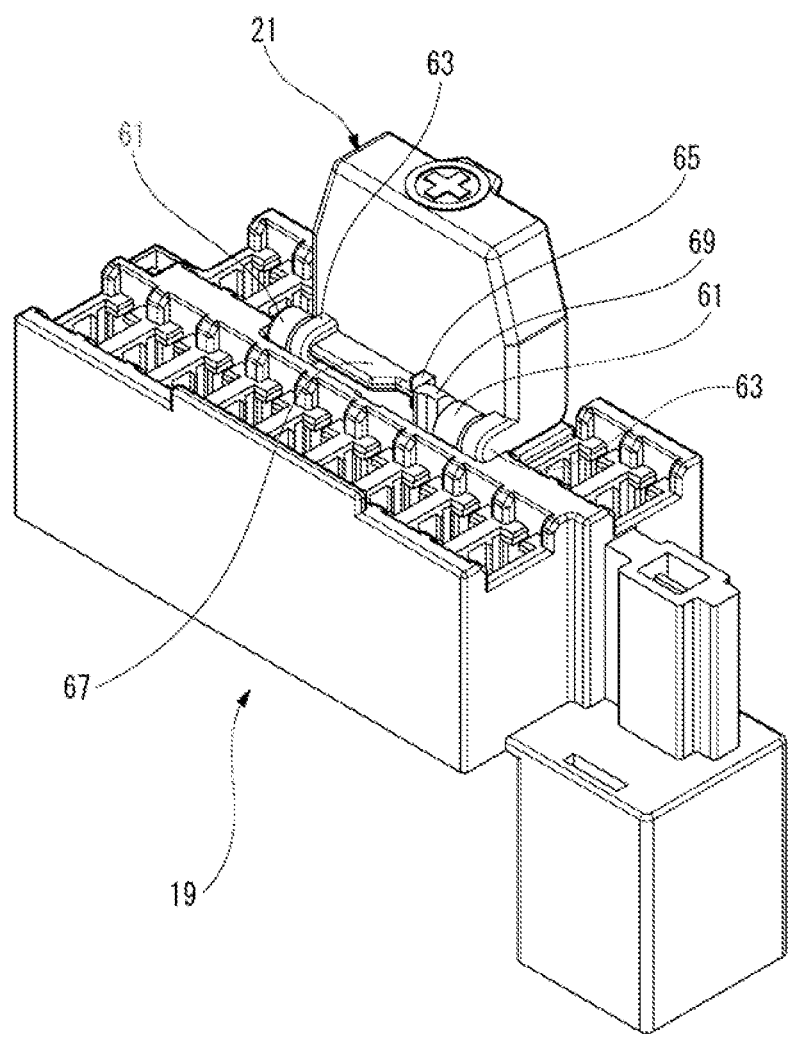
FIG. 2 is a perspective view of a rescue terminal portion covered with a resin cover.

FIG. 2 is a perspective view of the rescue terminal portion 17 covered with a resin cover 21. The rescue terminal portion 17 mounted on a connector mounting portion 23 of the frame body 13 (socket portion 19) is formed in a rectangular parallelepiped shape in a plan view. The rescue terminal portion 17 is covered by the resin cover 21 with a part of the rescue terminal portion 17 being exposed. The resin cover 21 is rotatably attached to the rescue terminal portion 17 by a rotation hinge structure. The resin cover 21 covers the rescue terminal portion 17 at a closed position shown in FIG. 2.

Figure 3:
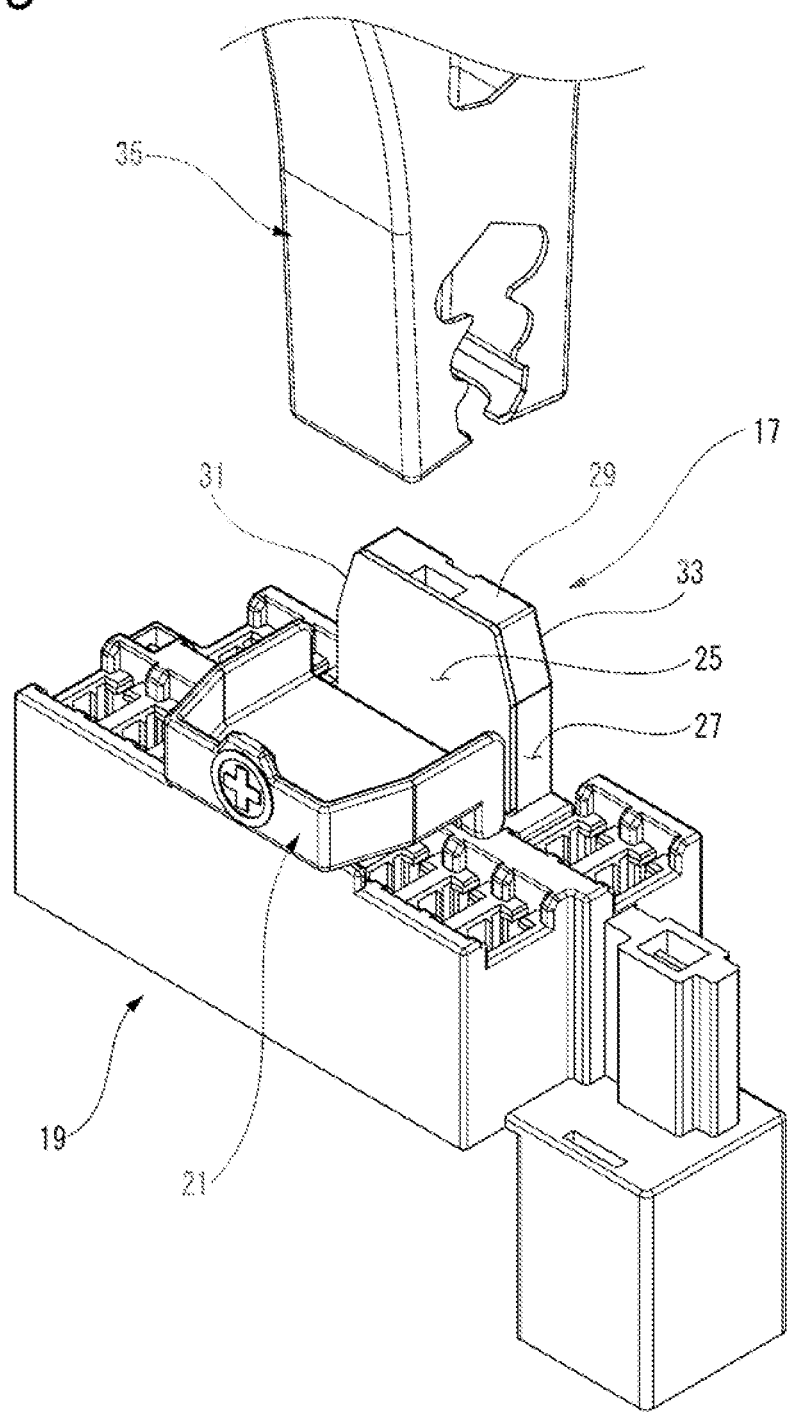
FIG. 3 is a perspective view of the rescue terminal portion exposed when a resin cover is rotated to an open position by a rotation hinge structure.

FIG. 3 is a perspective view of the rescue terminal portion 17 exposed when the resin cover 21 is rotated to an open position by the rotation hinge structure. The resin cover 21 covers one longitudinal side face 25, two lateral side faces 27 adjacent to the longitudinal side face 25, and an upper face 29 of the rescue terminal portion 17.

As shown in FIG. 3, the rescue terminal portion 17 is exposed when the resin cover 21 is at the open position and is provided with a plate-shaped rescue terminal 31 on the longitudinal side face 25. The rescue terminal 31 is supported by a terminal support plate 33 made of an insulating resin that stands perpendicularly to the frame body 13. That is, in the rescue terminal portion 17, the rescue terminal 31 and the terminal support plate 33 are stacked in a plate thickness direction, and the rescue terminal 31 is exposed on one face side of the terminal support plate 33. The rescue terminal portion 17 is sandwiched from the plate thickness direction by a clamp portion 35 (opening) made of a conductive metal which is closed by a spring force, and the rescue terminal 31 is electrically connected to a booster cable (not shown).

Figure 4:
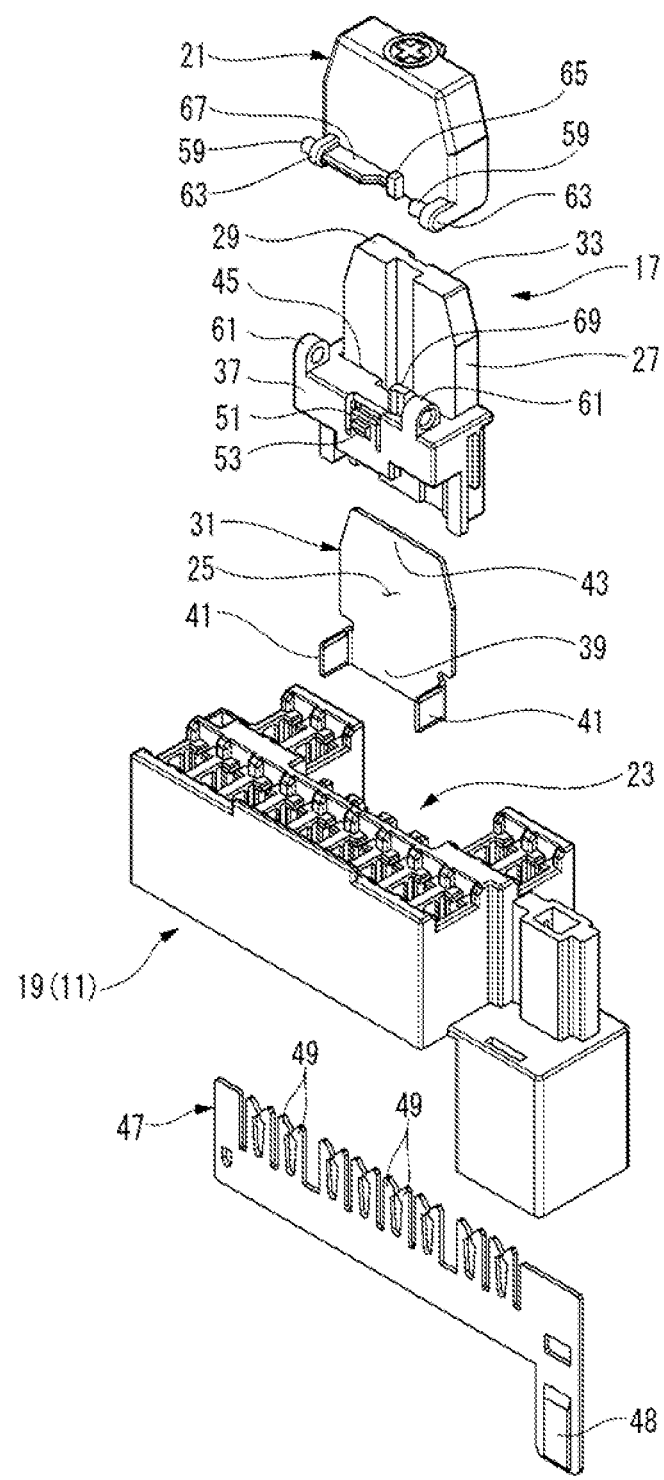
FIG. 4 is an exploded perspective view of a socket portion and the rescue terminal portion of a frame body.

FIG. 4 is an exploded perspective view of the socket portion 19 and the rescue terminal portion 17 of the frame body 13. An insertion portion 37 formed on the terminal support plate 33 in the rescue terminal portion 17 is detachably mounted on the socket portion 19 of the frame body 13. The rescue terminal portion 17 includes a pair of parallel electric contact pieces 41 bent perpendicularly to both side edges of a terminal base end portion 39 of the rescue terminal 31. In the rescue terminal 31, the terminal tip end portion 43 excluding the terminal base end portion 39 is inserted into a slit hole 45 formed in the terminal support plate 33 and held by the terminal support plate 33.

In the rescue terminal portion 17 in which the rescue terminal 31 and the terminal support plate 33 are integrated, when the insertion portion 37 is mounted on the connector mounting portion 23, the pair of electric contact pieces 41 are conductively connected to a tuning fork terminal group 47 disposed in a housing of the socket portion 19. In the tuning fork terminal group 47, a plurality of pairs of tuning fork terminals 49 made of pairs of holding pieces sandwiching the electric contact pieces 41 of the rescue terminal 31 from the plate thickness direction are formed in a plate shape. In the tuning fork terminal group 47, the socket portion 19 is mounted on the frame body 13, so that a strip-shaped power receiving terminal portion 48 formed at one end portion in an arrangement direction of the tuning fork terminals 49 is conductively connected to a busbar (not shown) on the frame body 13 side.

As shown in FIG. 3, a lock arm 51 shown in FIG. 4 is locked to an engagement recessed portion 57 (see FIG. 6), so that the rescue terminal portion 17 in which the insertion portion 37 is mounted on the socket portion 19 of the frame body 13 is restricted to remove from the connector mounting portion 23.

Figure 5:
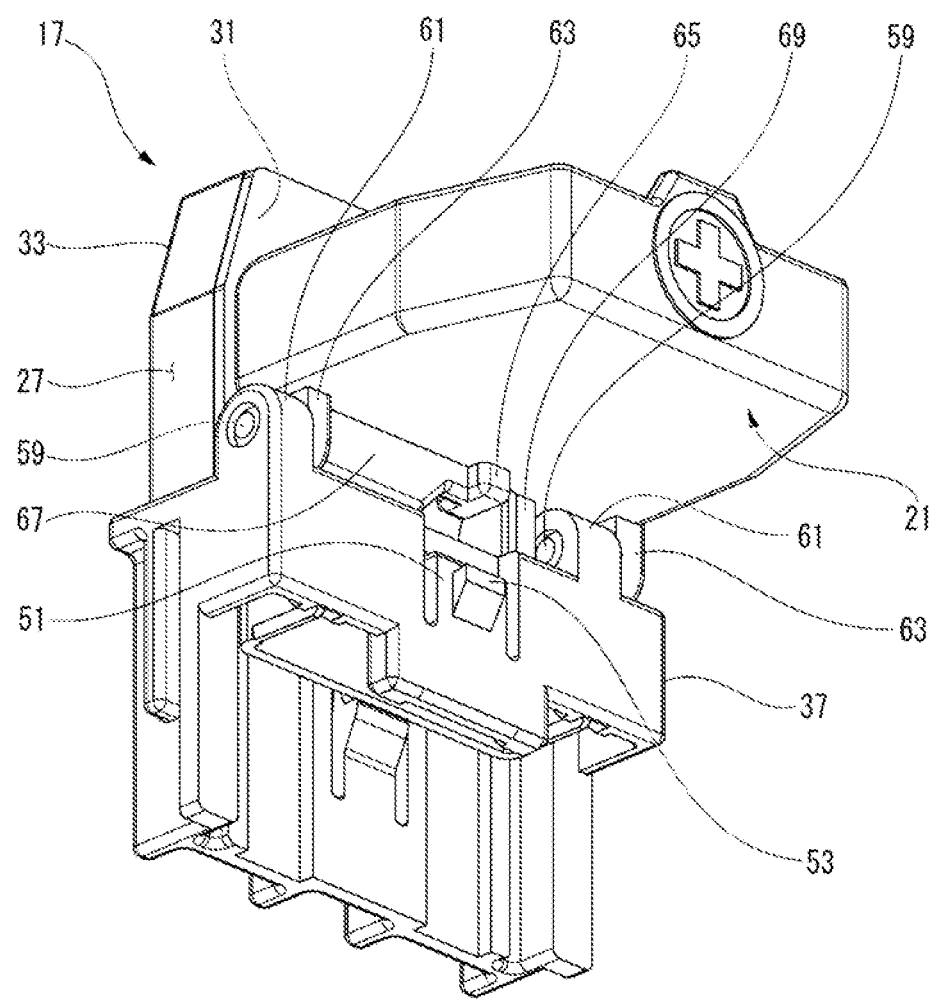
FIG. 5 is a perspective view of the rescue terminal portion and the resin cover detached from the frame body.

FIG. 5 is a perspective view of the rescue terminal portion 17 and the resin cover 21 detached from the frame body 13. The lock arm 51 is formed on a side face of the insertion portion 37. The lock arm 51 is disposed parallel to the side face of the insertion portion 37 by inserting a pair of parallel cuts into the side face of the insertion portion 37, and is flush with the side face of the insertion portion 37. The lock arm 51 has a cantilever shape in which a base end on a lower side in a mounting direction of the rescue terminal portion 17 is connected to the side face of the insertion portion 37, and a tip end on the opposite side which is an upper side in the mounting direction is a free end portion. The free end portion of the lock arm 51 is formed with a lock claw 53 protruding on a surface flush with the side face of the insertion portion 37. That is, the lock claw 53 protrudes from the side face of the insertion portion 37. When the lock claw 53 is pushed toward the insertion portion 37, the free end portion of the lock arm 51 is elastically deformed and pushed to a position where the lock claw 53 is flush with the side face of the insertion portion 37. That is, in a normal state, the lock claw 53 protrudes from the side face of the insertion portion 37.

Figure 6:
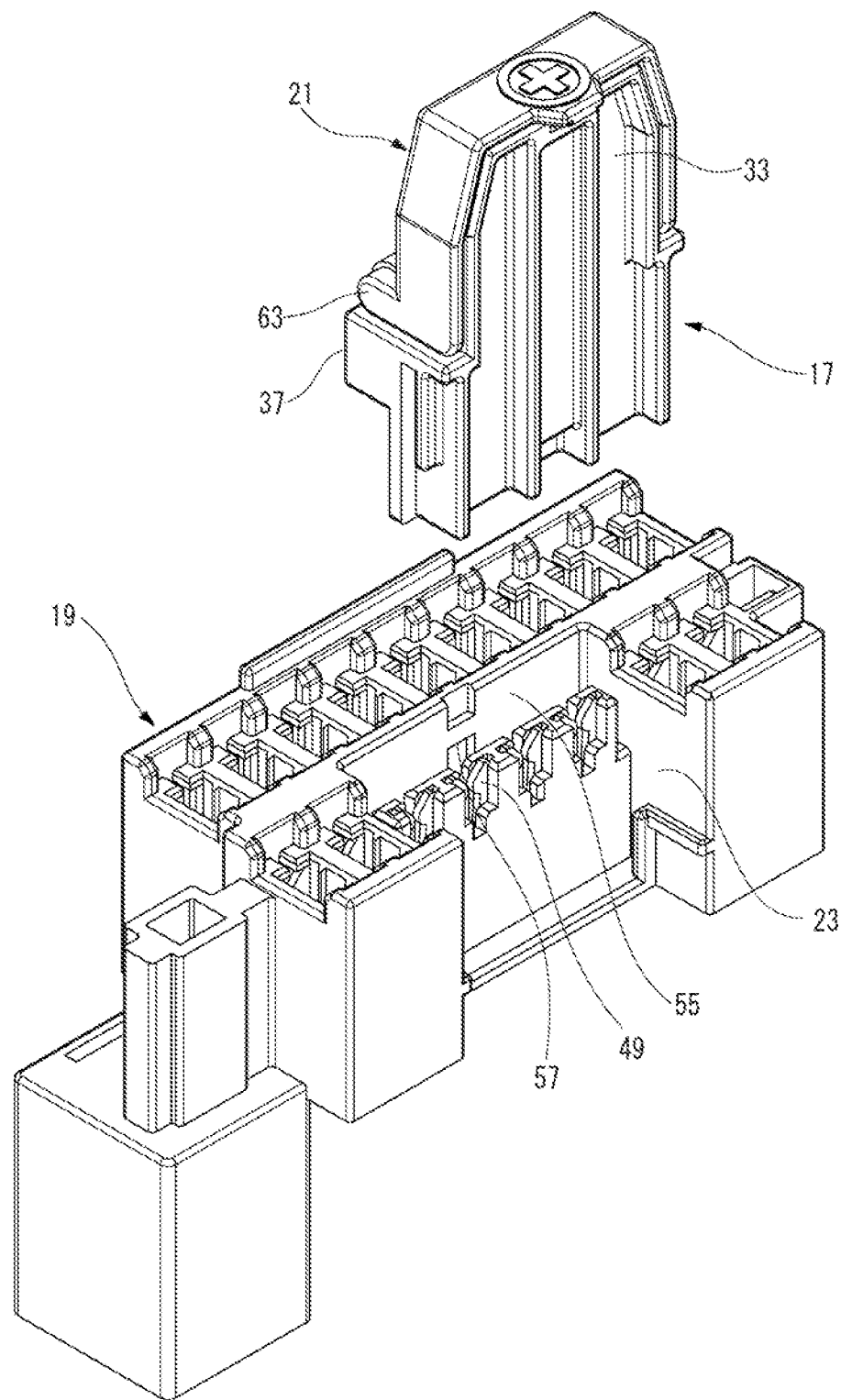
FIG. 6 is an exploded perspective view of a state in which the rescue terminal portion is detached from the socket portion.

FIG. 6 is an exploded perspective view of a state in which the rescue terminal portion 17 is detached from the socket portion 19. For example, in the rescue terminal portion 17 in which the resin cover 21 is at the closed position, when the insertion portion 37 is mounted on the connector mounting portion 23, the lock claw 53 is pressed and pushed into an inner side face 55 of the connector mounting portion 23. Then, when the insertion portion 37 is inserted (mounted) to a predetermined position, the lock claw 53 is displaced to an original position by an elastic restoring force and locked to the engagement recessed portion 57 formed in the inner side face 55 of the connector mounting portion 23. Accordingly, the rescue terminal portion 17 is restricted from being detached from the connector mounting portion 23. On the other hand, when the free end portion of the lock arm 51 is moved to a position where the lock claw 53 is flush with the side face of the insertion portion 37 by using a jig or the like, the engagement with the engagement recessed portion 57 is released, and the insertion portion 37 can be separated from the connector mounting portion 23.

As shown in FIG. 4, the resin cover 21 includes a pair of coaxial rotary shafts 59 extending along the longitudinal direction on a base end portion side of the longitudinal side face 25. The resin cover 21 is rotatable with respect to the frame body 13 (that is, the rescue terminal portion 17) about the rotary shaft 59.

Figure 7:
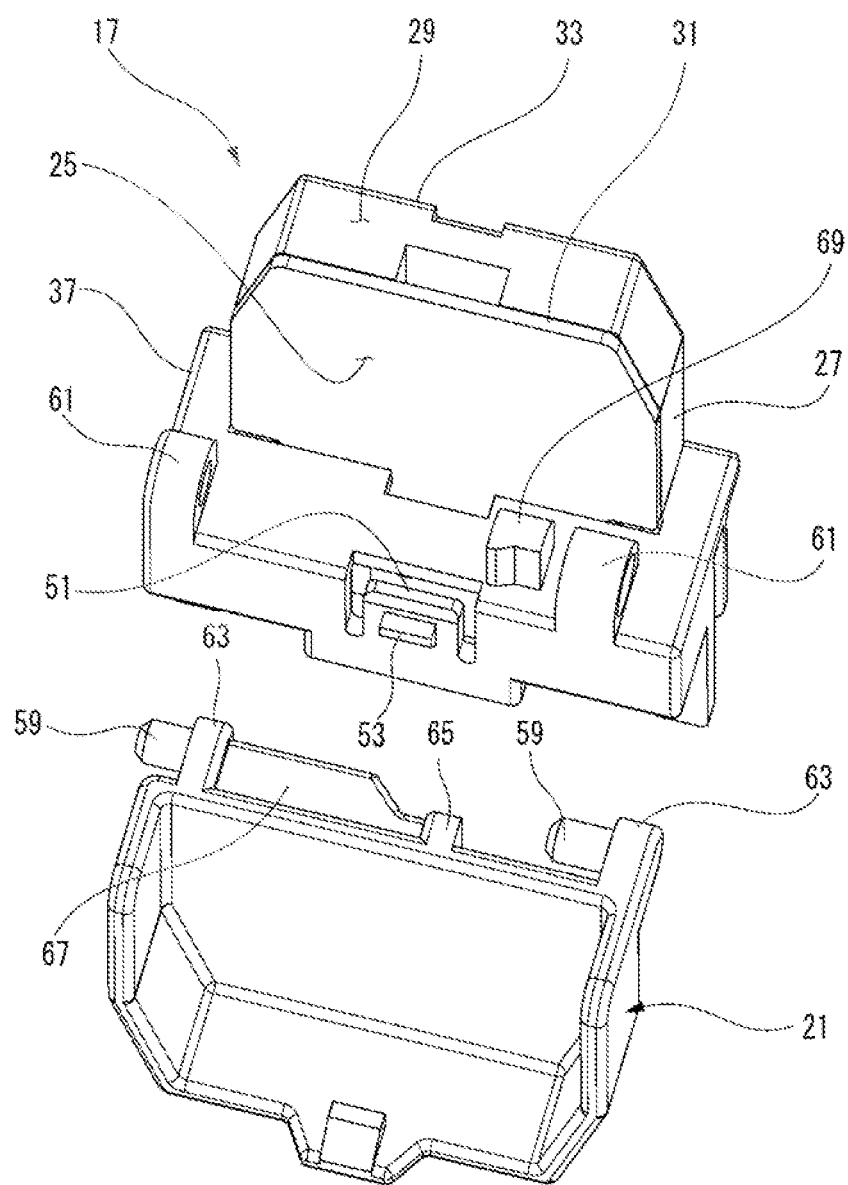
FIG. 7 is an exploded perspective view of the rescue terminal portion and the resin cover.

FIG. 7 is an exploded perspective view of the rescue terminal portion 17 and the resin cover 21. The terminal support plate 33 of the rescue terminal portion 17 includes a pair of bearing portions 61 on an upper face of the insertion portion 37 in which the slit hole 45 through which the terminal tip end portion 43 protrudes is opened. The pair of bearing portions 61 are disposed so as to be spaced apart from each other at positions at which the pair of rotary shafts 59 are supported. The pair of rotary shafts 59 provided in the resin cover 21 are both provided in the resin cover 21 by a shaft support portion 63 formed on the same end side (right end side in FIG. 7). The pair of rotary shafts 59 are inserted by sliding shaft tip end portions on a side opposite to the shaft support portions 63 from the same direction of the pair of bearing portions 61 at the same time. In the resin cover 21 in which the rotary shafts 59 are inserted into the bearing portions 61 by sliding, the shaft support portions 63 come into contact with the bearing portions 61, and further sliding is restricted.

Figure 8:
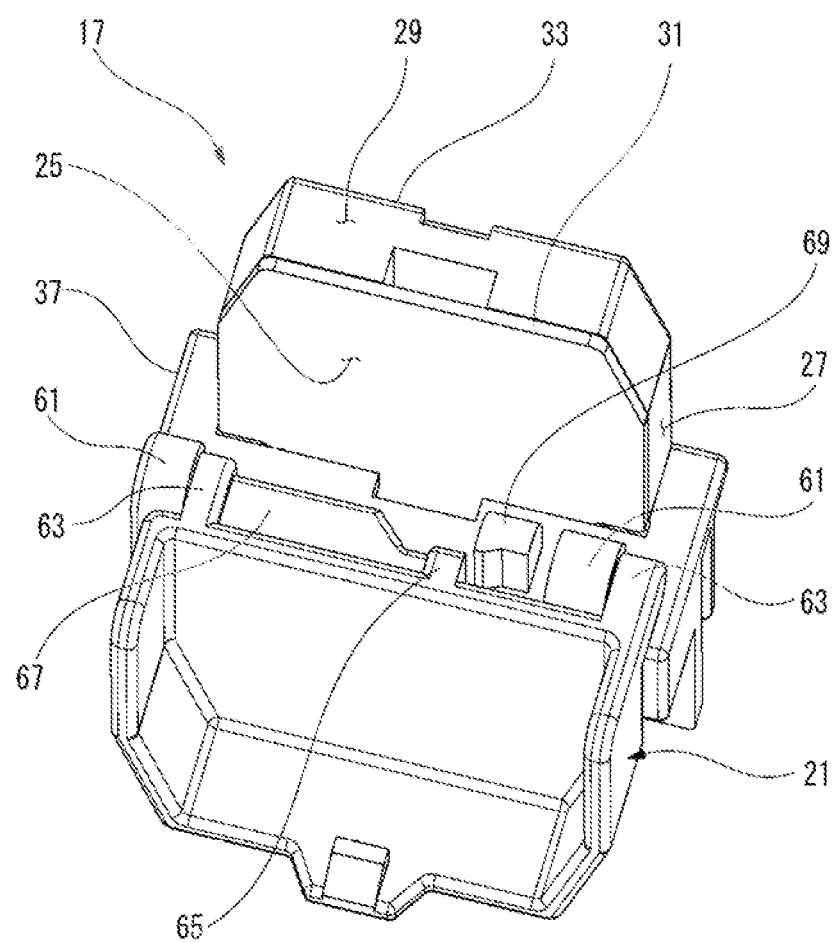
FIG. 8 is a perspective view of the rescue terminal portion in a state in which the resin cover is rotated to a fully open position.

FIG. 8 is a perspective view of the rescue terminal portion 17 in a state in which the resin cover 21 is rotated to a fully open position. When the resin cover 21 is mounted on the rescue terminal portion 17, the resin cover 21 is rotated from the closed position (position shown in FIG. 2) to an open position (position shown in FIG. 3), which is substantially 90 degrees. Further, after the rescue terminal portion 17 is detached from the frame body 13, the resin cover 21 can further rotate by substantially 90 degrees to a position at which the resin cover 21 comes into contact with the side face of the insertion portion 37 (fully open position) as shown in FIG. 8. That is, a rotation angle range of the resin cover 21 is substantially 180 degrees from the closed position to the fully open position in a state in which the rescue terminal portion 17 is detached from the frame body 13.

Figure 9:
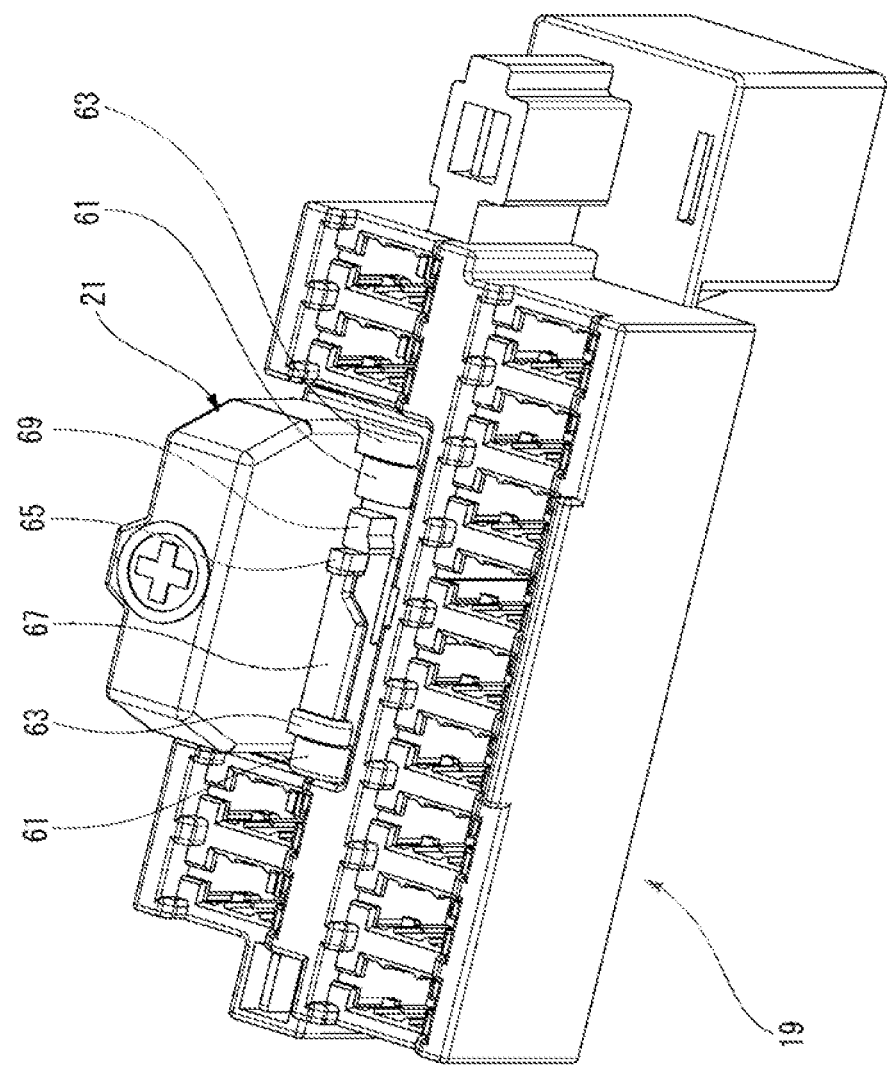
FIG. 9 is a perspective view of the rescue terminal portion covered with the resin cover as viewed obliquely from above.

FIG. 9 is a perspective view of the rescue terminal portion 17 covered with the resin cover 21 as viewed obliquely from above. A slide restriction protrusion 65 is formed between the shaft support portion 63 on one side (the left side in FIG. 9) and the shaft support portion 63 on the other side (the right side in FIG. 9) of the resin cover 21. In the resin cover 21, a reinforcing plate portion 67 is formed between the shaft support portion 63 on the one side (left side in FIG. 9) and the slide restriction protrusion 65. On the other hand, in the terminal support plate 33 of the rescue terminal portion 17, a stopper protrusion 69 that comes into contact with the slide restriction protrusion 65 to restrict the sliding of the resin cover 21 toward the right direction in FIG. 9 is formed on the upper face of the insertion portion 37.

In the closed position shown in FIG. 9, the slide restriction protrusion 65 of the resin cover 21 comes into contact with the stopper protrusion 69 and the sliding is restricted. Further, in the resin cover 21, even at the open position rotated by 90 degrees shown in FIG. 5, the slide restriction protrusion 65 comes into contact with the stopper protrusion 69 and the sliding is restricted. That is, in a state in which the rescue terminal portion 17 is mounted on the frame body 13, the resin cover 21 comes into contact with the socket portion 19 of the frame body 13 and is rotated only to the open position by 90 degrees, and therefore, the sliding of the resin cover 21 remains restricted.

Here, the rotation hinge structure for rotatably holding the resin cover 21 allows the resin cover 21 to be attached to and detached from the rescue terminal portion 17 only at the fully open position (the position rotated by 180 degrees). That is, as shown in FIG. 8, the resin cover 21 is moved to a position where the slide restriction protrusion 65 does not interfere with the stopper protrusion 69 at a position rotated by 180 degrees from the closed position.

Figure 10:
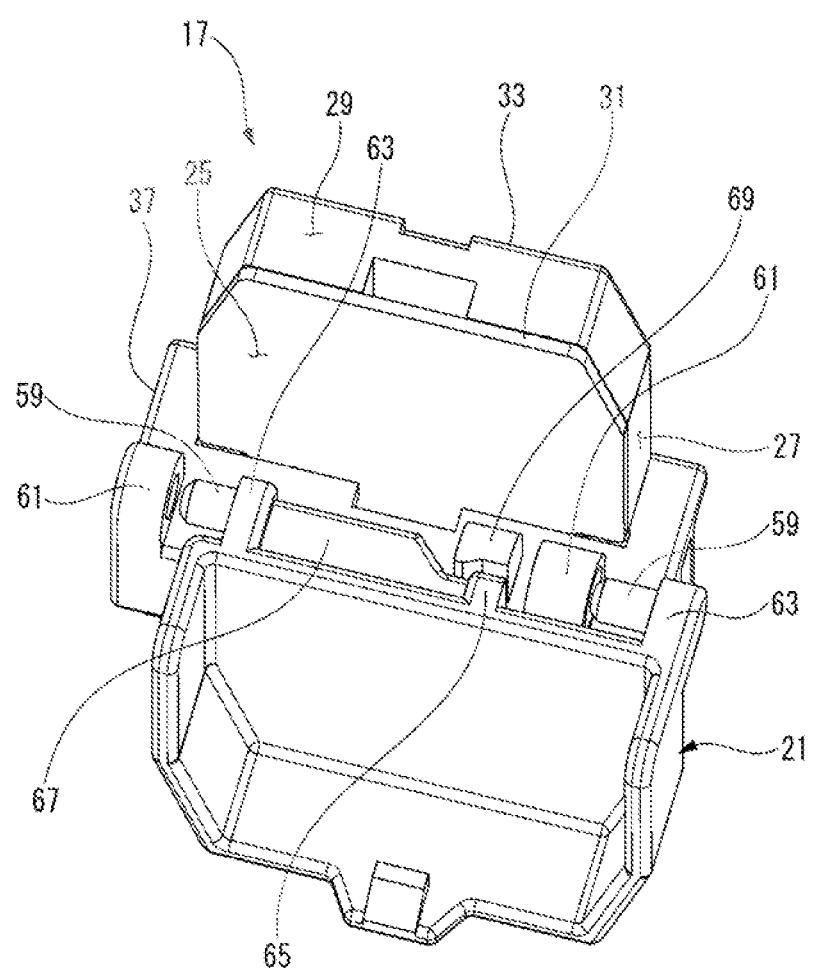
FIG. 10 is a perspective view of the rescue terminal portion in a state in which a rotary shaft of the resin cover is removed from a bearing portion of a terminal support plate.

FIG. 10 is a perspective view of the rescue terminal portion 17 in a state in which the rotary shaft 59 of the resin cover 21 is removed from the bearing portion 61 of the terminal support plate 33. Since the slide restriction protrusion 65 does not interfere with the stopper protrusion 69 at the fully open position, as shown in FIG. 10, the resin cover 21 can slide in a direction in which the rotary shafts 59 are pulled out from the bearing portions 61. As shown in FIG. 7, the resin cover 21 in which the rotary shafts 59 are removed from the bearing portions 61 can be removed from the rescue terminal portion 17. It should be noted that the attachment of the resin cover 21 to the rescue terminal portion 17 can be performed in a procedure reverse to the procedure in which the resin cover 99 is removed from the fully open position.

Figure 11:
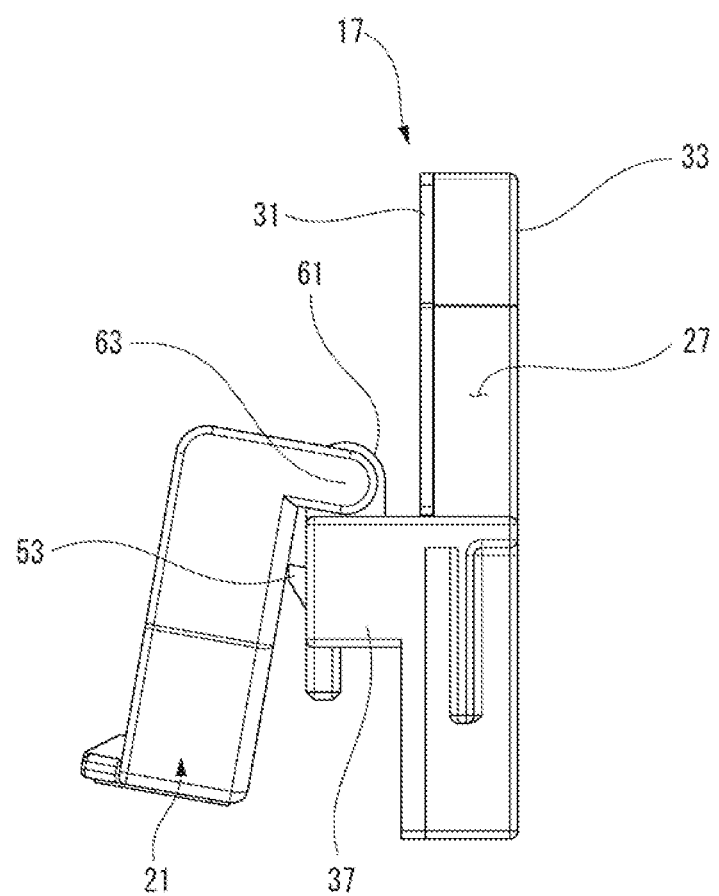
FIG. 11 is a side view of a state in which the resin cover is in contact with a lock claw of a lock arm immediately before the fully open position.

FIG. 11 is a side view of a state in which the resin cover 21 is in contact with the lock claw 53 of the lock arm 51 immediately before the fully open position. When the resin cover 21 is about to rotate to the fully open position, the resin cover 21 comes into contact with the lock claw 53 of the lock arm 51 just before the fully open position, and the rotation of the resin cover 21 to the fully open position is restricted. That is, the slide restriction protrusion 65 is still in contact with the stopper protrusion 69 when the resin cover 21 is at the rotation position where the resin cover 21 is in contact with the lock claw 53 shown in FIG. 11, and the sliding is restricted.

That is, the lock arm 51 that detachably holds the rescue terminal portion 17 with respect to the frame body 13 functions to hold the resin cover 21 at a position immediately before the fully open position.

Since the lock arm 51 has elasticity as described above, the lock arm 51 can be pushed to a position where the lock claw 53 is flush with the side face of the insertion portion 37. Therefore, the resin cover 21 held just before the fully open position where the sliding is restricted can slide by pushing the lock claw 53 and rotating to the fully open position. That is, the resin cover 21 can be removed.

Next, functions of the above configuration will be described. In the electrical junction box 11 according to the present embodiment, the frame body 13 includes the rescue terminal portion 17. The clamp portion 35 of the booster cable can be connected to the rescue terminal portion 17. Although the rescue terminal portion 17 can be separated from the frame body 13 in the present embodiment, the rescue terminal portion 17 may not be separated from the frame body 13. The rescue terminal portion 17 includes the resin cover 21. The resin cover 21 can cover the one longitudinal side face 25, the two lateral side faces 27 adjacent to the longitudinal side face 25, and the upper face 29 of the rescue terminal portion 17.

The resin cover 21 is rotatable with respect to the frame body 13 about the rotary shaft 59 extending along the longitudinal direction on the base end side opposite to the upper face 29 of the one longitudinal side face 25. That is, the resin cover 21 is rotated (opened and closed), by rotating about the rotary shaft 59 with respect to the frame body 13, between the closed position at which the resin cover 21 covers the rescue terminal portion 17 and the open position at which the rescue terminal portion 17 is exposed.

In the electrical junction box 11 according to the present embodiment, the rotary shaft 59 of the resin cover 21 extends along the longitudinal direction of the rescue terminal portion 17 having a rectangular parallelepiped shape, so that a rotation radius around the rotary shaft 59 of the resin cover 21 is smaller as compared with a rotation hinge structure of the related art in which the rotary shaft 59 is provided in a lateral direction of the rescue terminal portion 17. That is, in the electrical junction box 11 according to the present embodiment, the opening and closing space of the resin cover 21 can be made smaller than that of the structure in the related art.

Further, in the rotation hinge structure of the electrical junction box 11 according to the present embodiment, the rotary shaft 59 is provided in the longitudinal direction of the resin cover 21, so that a force in a twisting direction acting on the rotary shaft 59 is reduced by the principle of leverage during the opening and closing operation of the resin cover 21. As a result, the rotary shaft 59 of the resin cover 21 is less likely to come off from the frame body 13.

In the electrical junction box 11 according to the present embodiment, the resin cover 21 can be attached to and detached from the rescue terminal portion 17 only at the fully open position. In the electrical junction box 11, as described above, the resin cover 21 is rotated between the closed position at which the resin cover 21 covers the rescue terminal portion 17 and the open position at which the rescue terminal portion 17 is exposed. The resin cover 21 is further rotated from the open position at which the rescue terminal portion 17 is exposed, so that the resin cover 21 is in the fully open position.

In the rescue terminal portion 17, the rescue terminal 31 formed of a rectangular metal plate vertically stands from the frame body 13. One surface of the rescue terminal 31 is supported by the terminal support plate 33 made of an insulating resin that stands perpendicularly to the frame body 13. In the rescue terminal portion 17, the rescue terminal 31 and the terminal support plate 33 are stacked in the plate thickness direction, and the rescue terminal 31 is exposed on one face side of the terminal support plate 33. The rescue terminal portion 17 is sandwiched from the plate thickness direction by the clamp portion 35 made of a conductive metal.

At the closed position, the resin cover 21 is parallel to the rescue terminal portion 17 standing vertically, and covers the rescue terminal 31 exposed on one surface of the rescue terminal portion 17. When the resin cover 21 is rotated by substantially 90 degrees from the closed position, the resin cover 21 comes into contact with the frame body 13 and is no longer rotated any more. That is, the rotation to the fully open position is restricted by the frame body 13 (the socket portion 19). As a result, the resin cover 21 is less likely to come off from the frame body 13 by an opening and closing operation.

In the electrical junction box 11, when the lock by the lock arm 51 is released and the rescue terminal portion 17 is detached from the frame body 13, the resin cover 21 can be further rotated from the open position. Specifically, when the rescue terminal portion 17 is mounted on the frame body 13, the resin cover 21 is rotated from the closed position to the open position substantially at 90 degrees. After the rescue terminal portion 17 is detached from the frame body 13, the resin cover 21 can further rotate by 90 degrees to a position (fully open position) at which the resin cover 21 comes into contact with the side face of the insertion portion 37.

Here, as shown in FIG. 11, the resin cover 21 comes into contact with the lock claw 53 provided on the lock arm 51, and therefore, further rotation of the resin cover 21 is restricted at a position immediately before the fully open position. That is, even after the rescue terminal portion 17 is detached from the frame body 13, the resin cover 21 does not reach the fully open position by abutting against the lock claw 53, so that the resin cover 21 does not come off from the rescue terminal portion 17.

In order to remove the resin cover 21 from the rescue terminal portion 17, the lock claw 53 is pressed by the resin cover 21 to elastically deform the lock arm 51, and the resin cover 21 is rotated to the fully open position where the resin cover 21 comes into contact with the side face of the insertion portion 37. Accordingly, the resin cover 21 can be detached from the rescue terminal portion 17. That is, the resin cover 21 can be removed from the rescue terminal portion 17. As a result, in the electrical junction box 11, the resin cover 21 is less likely to come off, and the resin cover 21 is less likely to be lost.

Therefore, according to the electrical junction box 11 of the present embodiment, it is possible to prevent the resin cover 21 from coming off while the opening and closing space of the resin cover 21 is reduced.

According to an aspect of the embodiments described above, an electrical junction box (11) includes a frame body (13), a rescue terminal portion (17) formed in a rectangular parallelepiped shape in a plan view and including a longitudinal side face (25), two lateral side faces (27) connected to the longitudinal side face (25), and an upper face (29), a resin cover (21) configured to cover the longitudinal side face (25), the two lateral side faces (27) and the upper face (29). The resin cover (21) includes a rotary shaft (59) extending along the longitudinal side face (25) and provided on a side where the longitudinal side face (25) is provided and on a base end portion of the rescue terminal portion (17) opposite to the upper face (29), the resin cover (21) being configured to rotate with respect to the frame body (13) about the rotary shaft (59).

According to the electrical junction box (11) having the configuration as described above includes the frame body (13) and the rescue terminal portion (17). The rescue terminal portion (17) may or may not be separable from the frame body (13). In the electrical junction box (11) having the configuration, the rotary shaft (59) of the resin cover (21) extends along the longitudinal direction of the rescue terminal portion (17) having a rectangular parallelepiped shape, so that a rotation radius around the rotary shaft (59) of the resin cover (21) is smaller as compared with a rotation hinge structure in which the rotary shaft (59) is provided along a lateral direction of the rescue terminal portion (17). That is, in the electrical junction box (11) having the configuration, the opening and closing space of the resin cover (21) can be made smaller than that of the structure in the related art. Further, in the rotation hinge structure of the electrical junction box (11) having the configuration, the rotary shaft (59) is provided along the longitudinal direction of the resin cover (21), so that a force in a twisting direction acting on the rotary shaft (59) is reduced by the principle of leverage during the opening and closing operation of the resin cover (21). As a result, the rotary shaft (59) of the resin cover (21) is less likely to come off from the frame body (13).

A rotation hinge structure configured to rotatably hold the resin cover (21) may be configured to allow the resin cover (21) to be attached to and detached from the rescue terminal portion (17) only when the resin cover (21) is at a fully open position.

With this configuration, the resin cover (21) is rotatably held on the frame body (13) by the rotation hinge structure. In the rotation hinge structure, the resin cover (21) can be attached to and detached from the rescue terminal portion (17) only at the fully open position of the resin cover (21). The resin cover (21) is rotated between a closed position at which the resin cover (21) covers the rescue terminal portion (17) and the open position at which the rescue terminal portion (17) is exposed. The resin cover (21) is further rotated from the open position at which the rescue terminal portion (17) is exposed, so that the resin cover (21) reaches in the fully open position. At the closed position, the resin cover (21) is parallel to the rescue terminal portion (17) standing vertically, and covers the rescue terminal (31) provided on one surface of the rescue terminal portion (17). When the resin cover (21) is rotated by substantially 90 degrees from the closed position, the resin cover (21) comes into contact with the frame body (13) and is no longer rotated any more. That is, the rotation to the fully open position is restricted by the frame body (13). As a result, the resin cover (21) is less likely to come off from the frame body (13) due to the opening and closing operation.

A lock arm (51) configured to detachably hold the rescue terminal portion (17) with respect to the frame body (13) may be configured to hold the resin cover (21) at a position immediately before the fully open position.

With this configuration, the rescue terminal portion (17) is formed separately from the frame body (13). In the rescue terminal portion (17), the rescue terminal (31) and the terminal support plate (33) are stacked and integrated in the plate thickness direction. The insertion portion (37) formed on the terminal support plate (33) in the rescue terminal portion (17) is detachably mounted on the frame body (13). The rescue terminal portion (17) is restricted from being detached from the frame body (13) by the lock arm (51). The lock arm (51) is formed on the side face of the insertion portion (37). The lock arm (51) is disposed parallel to the side face of the insertion portion (37), and is flush with the side face of the insertion portion (37). The lock arm 51 has a cantilever shape. The lock arm (51) is formed with the lock claw (53) protruding from a surface flush with the side face of the insertion portion (37). When the lock claw (53) is pushed toward the insertion portion (37), the lock arm (51) is elastically deformed and pushed to a position where the lock claw (53) is flush with the side face of the insertion portion (37). That is, in a normal state, the lock claw (53) protrudes from the side face of the insertion portion (37). In the electrical junction box (11) having the configuration, when the lock by the lock arm (51) is released and the rescue terminal portion (17) is detached from the frame body (13), the resin cover (21) can be further rotated from the open position. The resin cover (21) comes into contact with the lock claw (53) provided on the lock arm (51), and therefore, further rotation of the resin cover (21) is restricted at a position immediately before the fully open position. That is, even after the rescue terminal portion (17) is detached from the frame body (13), the resin cover (21) does not reach the fully open position by abutting against the lock claw (53), so that the resin cover (21) does not come off from the rescue terminal portion (17). In order to remove the resin cover (21) from the rescue terminal portion (17), the lock claw (53) is pressed by the resin cover (21) to elastically deform the lock arm (51), and the resin cover (21) is rotated to the fully open position where the resin cover (21) comes into contact with the side face of the insertion portion (37). Accordingly, the resin cover (21) can be detached from the rescue terminal portion (17).

While the presently disclosed subject matter has been described with reference to certain exemplary embodiments thereof, the scope of the presently disclosed subject matter is not limited to the exemplary embodiments described above, and it will be understood by those skilled in the art that various changes and modifications may be made therein without departing from the scope of the presently disclosed subject matter as defined by the appended claims.

What is claimed is:

1. An electrical junction box comprising:
 a frame body;
 a rescue terminal portion formed in a rectangular parallelepiped shape in a plan view and including a longitudinal side face, two lateral side faces connected to the longitudinal side face, and an upper face, wherein the longitudinal side face is longer than each of the two lateral side faces; and
 a resin cover configured to cover the longitudinal side face, the two lateral side faces and the upper face,
 wherein the resin cover includes a rotary shaft extending along the longitudinal side face and provided on a side where the longitudinal side face is provided and on a base end portion of the rescue terminal portion opposite to the upper face, the resin cover being configured to rotate with respect to the frame body about the rotary shaft.

2. The electrical junction box according to claim 1,
 wherein a rotation hinge structure configured to rotatably hold the resin cover is configured to allow the resin cover to be attached to and detached from the rescue terminal portion only when the resin cover is at a fully open position, and
 wherein only after the rescue terminal portion is detached from the frame body, the resin cover can rotate to the fully open position.

3. An electrical junction box comprising:
 a frame body;
 a rescue terminal portion formed in a rectangular parallelepiped shape in a plan view and including a longitudinal side face, two lateral side faces connected to the longitudinal side face, and an upper face; and
 a resin cover configured to cover the longitudinal side face, the two lateral side faces and the upper face,
 wherein the resin cover includes a rotary shaft extending along the longitudinal side face and provided on a side where the longitudinal side face is provided and on a base end portion of the rescue terminal portion opposite to the upper face, the resin cover being configured to rotate with respect to the frame body about the rotary shaft,
 wherein a rotation hinge structure configured to rotatably hold the resin cover is configured to allow the resin cover to be attached to and detached from the rescue terminal portion only when the resin cover is at a fully open position, and
 wherein a lock arm configured to detachably hold the rescue terminal portion with respect to the frame body is configured to hold the resin cover at a position immediately before the fully open position.

* * * * *